United States Patent
Menand et al.

(10) Patent No.: US 11,668,258 B2
(45) Date of Patent: Jun. 6, 2023

(54) METHOD AND DEVICE FOR CONTROLLING AN ENGINE WITH A RECONSTITUTED CRANKSHAFT SIGNAL

(71) Applicant: Vitesco Technologies GmbH, Regensburg (DE)

(72) Inventors: Thierry Menand, Toulouse (FR); Stéphane Eloy, Toulouse (FR)

(73) Assignee: Vitesco Technologies GmbH, Regensburg (DE)

( * ) Notice: Subject to any disclaimer, the term of this patent is extended or adjusted under 35 U.S.C. 154(b) by 0 days.

(21) Appl. No.: 17/792,258

(22) PCT Filed: Mar. 22, 2021

(86) PCT No.: PCT/EP2021/057267
§ 371 (c)(1),
(2) Date: Jul. 12, 2022

(87) PCT Pub. No.: WO2021/191147
PCT Pub. Date: Sep. 30, 2021

(65) Prior Publication Data
US 2023/0079159 A1    Mar. 16, 2023

(30) Foreign Application Priority Data

Mar. 24, 2020  (FR) ...................................... 2002865

(51) Int. Cl.
*F02D 41/34*    (2006.01)
*F02D 41/00*    (2006.01)
(Continued)

(52) U.S. Cl.
CPC ......... *F02D 41/009* (2013.01); *F02D 41/266* (2013.01); *F02P 7/077* (2013.01)

(58) Field of Classification Search
CPC ....... F02D 41/009; F02D 41/266; F02P 7/077
See application file for complete search history.

(56) References Cited

U.S. PATENT DOCUMENTS

| 5,245,968 | A | 9/1993 | Kolias et al. |
| 5,263,450 | A | 11/1993 | Hashimoto et al. |

(Continued)

FOREIGN PATENT DOCUMENTS

WO    2007115594 A1    10/2007

OTHER PUBLICATIONS

English Translation of Written Opinion for International Application No. PCT/EP2021/057267, dated May 19, 2021, 6 pages.

(Continued)

*Primary Examiner* — Freddie Kirkland, III
(74) *Attorney, Agent, or Firm* — RatnerPrestia

(57) ABSTRACT

A method and device for controlling a four-stroke internal combustion engine, including a step of producing a reconstituted crankshaft signal having an electrical signal extending over two crankshaft revolutions in the nominal direction of rotation of the engine, the electrical signal including: a single main pulse, having a predetermined first duration, corresponding to the passing of a predetermined reference tooth of the toothed wheel associated with the crankshaft of the engine; a plurality of secondary pulses, each having a predetermined second duration, each corresponding to the passing of a tooth of the toothed wheel associated with the crankshaft of the engine; the predetermined first duration being greater than the predetermined second duration.

12 Claims, 4 Drawing Sheets

(51) Int. Cl.
F02P 7/077 (2006.01)
F02D 41/26 (2006.01)

(56) References Cited

U.S. PATENT DOCUMENTS

| | | | |
|---|---|---|---|
| 10,240,550 B2* | 3/2019 | Mazenc | G01D 5/00 |
| 11,054,435 B2* | 7/2021 | Joseph | F02D 41/28 |
| 2014/0046574 A1 | 2/2014 | Eisenbarth et al. | |
| 2022/0228536 A1* | 7/2022 | Eloy | F02D 41/009 |

OTHER PUBLICATIONS

International Search Report and Written Opinion for International Application No. PCT/EP2021/057267, dated May 19, 2021. 9 pages.

International Search Report and Written Opinion for International Application No. PCT/EP2021/057267, dated May 19, 2021, 12 pages (French).

* cited by examiner

METHOD AND DEVICE FOR CONTROLLING AN ENGINE WITH A RECONSTITUTED CRANKSHAFT SIGNAL

CROSS REFERENCE TO RELATED APPLICATIONS

This application is the U.S. National Phase Application of PCT International Application No. PCT/EP2021/057267, filed Mar. 22, 2021, which claims priority to French Patent Application No. 2002865, filed Mar. 24, 2020, the contents of such applications being incorporated by reference herein.

FIELD OF THE INVENTION

The invention relates to the field of four-stroke internal combustion engines implemented in particular in the automotive sector.

BACKGROUND OF THE INVENTION

Internal combustion engines are commonly implemented with an engine control unit (ECU) capable of receiving information about the state of the engine from various sensors, and carrying out, at the appropriate time, control operations such as, for example, triggering the injection of fuel or triggering a spark plug spark.

For reasons of performance, efficiency and pollutant emissions reduction, recent engine control methods in the automotive field require extremely precise regulation of the engine control members, in particular the fuel injection sequences and, in the case of petrol engines, ignition sequences. This precision in the control of the engine requires very precise knowledge of the instantaneous position of the engine in its four-stroke cycle. Knowing the instantaneous position of the engine in its cycle makes it possible to know the position of each piston at all times, in relation to an event such as ignition or fuel injection.

Internal combustion engines generally include one or more pistons actuating the rotation of a crankshaft rotatably coupled to a flywheel provided with a toothed wheel. A sensor, such as a Hall-effect sensor, is generally positioned facing the toothed wheel and is capable of transmitting to the engine control unit information representing the passing of each tooth in front of the sensor, when the engine is running. This toothed wheel is also asymmetrical (one or more missing teeth, for example), which makes it possible to initialize the tooth counting strategies (or engine position calculation strategies) when this asymmetry passes by. The engine control unit thus has information about the instantaneous angular position of the crankshaft.

As the internal combustion engine in this case is a four-stroke engine, the complete engine cycle (intake, compression, expansion, exhaust) takes place over two crankshaft rotations. Knowing the angular position of the crankshaft is not therefore sufficient to know the precise position of the engine in the cycle. Internal combustion engines therefore have another sensor linked to the valves such as a camshaft sensor capable of transmitting information about the position of the valves to the engine control unit.

The engine control unit is able to precisely determine the instantaneous position of the engine by combining the information provided by the crankshaft sensor and the camshaft sensor, using an operation commonly known as "synchronization".

Recent developments in the field of internal combustion engines implement new members, regulated independently of the engine control unit, which require knowledge of the precise position of the engine in its four-stroke cycle. This is the case, for example, of electric devices for variable valve timing (VVT). These devices, which were previously hydraulic, have recently evolved into electric devices and allow improved control of the movement of the valves in order to improve engine performance, reduce pollutant emissions, and reduce fuel consumption. The electric means actuating these variable valve timing devices are regulated by a valve control unit that is independent of the engine control unit and requires knowledge of the instantaneous position of the engine in its four-stroke cycle, in order to successfully time the valves.

The same synchronization operation can be carried out in the valve control unit as in the engine control unit, so that the valve control unit itself determines the position of the engine in its cycle. However, carrying out one synchronization in the engine control unit and an additional synchronization in the valve control unit entails doubling the calculation operations relating to synchronization, and therefore doubling the electronic means necessary for these calculations, which entails more complex, more costly engine control means.

In addition, the synchronization operation is a complex one when the precision required entails time scales of the order of one microsecond. This synchronization operation entails algorithms that are demanding in terms of calculation resources and produce a result that, although precise, is given within a given uncertainty range. Two synchronization operations carried out independently will thus produce results that can be very different, within this uncertainty range, which poses a risk for the operation of the engine when these synchronizations relate to members of the engine that must be perfectly synchronized, such as the valves and the fuel injection, for example.

Two independent synchronization operations (one in the engine control unit and the other in the valve control unit) can only therefore be implemented if a third synchronization is carried out that averages the first two. This type of operation makes the devices and methods implemented even more complex, and increases the cost and risk of malfunction.

SUMMARY OF THE INVENTION

The aim of the invention is to improve the methods and devices of the prior art.

To this end, an aspect of the invention relates to a method for controlling a four-stroke internal combustion engine comprising a first sensor for detecting the angular position of the camshaft and a second sensor for detecting the passing of the teeth of a toothed wheel associated with the crankshaft, said method comprising a step of determining the instantaneous position of the engine in its four-stroke cycle on the basis of the information provided by said sensors, said method further comprising a step of producing a reconstituted crankshaft signal comprising an electrical signal extending over two crankshaft revolutions in the nominal direction of rotation of the engine, said electrical signal comprising:

a single main pulse, having a predetermined first duration, corresponding to the passing of a predetermined reference tooth of the toothed wheel associated with the crankshaft;

a plurality of secondary pulses, having a predetermined second duration, each corresponding to the passing of a tooth of the toothed wheel associated with the crankshaft; the predetermined first duration being greater than the predetermined second duration.

According to another aspect, the invention relates to an engine control device capable of implementing the method described above, and comprising:
- an engine control unit to which said sensors are connected;
- a control unit specific to one member of the engine;
- a communication bus connecting the engine control unit to the specific control unit, and capable of transmitting the reconstituted crankshaft signal.

The specific control unit can be an electric variable valve timing control unit.

The method and the device according to an aspect of the invention add functions to the engine control functions. According to an aspect of the invention, the reconstituted crankshaft signal alone contains all of the information providing the precise instantaneous position of the engine in its four-stroke cycle.

An aspect of the invention makes it possible to carry out the sensor synchronization operation once only, in the engine control unit, and to provide the result to any other additional engine control unit in a directly usable form, even for an engine running at high speed. This additional control unit does not need access to the sensors, and requires few calculation resources in order to extract the information presented in the form of the reconstituted crankshaft signal.

An aspect of the invention is particularly suitable for complex engines having members with their own embedded control electronics in the form of an additional control unit, such as the aforementioned electric variable valve timing devices. Due to an aspect of the invention, such an engine simply comprises a communication bus between the engine control unit and the additional control unit, said bus transmitting the reconstituted crankshaft signal. From the point of view of the additional control unit, the communication bus simulates information provided by a virtual sensor directly providing information about the actual instantaneous position of the engine in its four-stroke cycle, in the form of the reconstituted crankshaft signal, without requiring synchronization.

An aspect of the invention thus makes it possible to simplify the electronics and the programming of all of the components outside the engine control unit, thus improving the cost, reliability and weight on board. All of these components receive position information coming from a single, unique synchronization operation, which increases the operating reliability of the members of the engine that work together.

The method according to an aspect of the invention can include the following additional features, alone or in combination:
- during the two crankshaft revolutions in the nominal direction of rotation of the engine, over which the reconstituted crankshaft signal extends, the reference tooth passes in front of the second sensor twice, the single main pulse being generated for one of said passes, and a secondary pulse being generated for the other of said passes;
- the toothed wheel associated with the crankshaft comprises a toothless gap, and the predetermined reference tooth is adjacent to this toothless gap;
- if the engine is running in its opposite direction of rotation, the electrical signal of the reconstituted crankshaft signal comprises, over two crankshaft revolutions in the opposite direction: a single modified main pulse, having a predetermined third duration, corresponding to the passing of the predetermined reference tooth in the opposite direction of rotation of the engine; a plurality of modified secondary pulses, each having a predetermined fourth duration, each corresponding to the passing of a crankshaft tooth in the opposite direction of rotation of the engine; the predetermined third duration being greater than the predetermined fourth duration;
- the predetermined fourth duration is greater than the predetermined second duration;
- the electrical signal of the reconstituted crankshaft signal combines signal segments comprising secondary pulses corresponding to the engine running in the nominal direction of rotation, and signal segments comprising modified secondary pulses corresponding to the engine running in the opposite direction of rotation;
- the step of determining the instantaneous position of the engine in its four-stroke cycle on the basis of the information provided by said sensors is carried out by an engine control unit to which said sensors are connected; and the reconstituted crankshaft signal is transmitted by a communication bus to a control unit specific to one member of the engine;
- the specific control unit determines the position of the engine in its four-stroke cycle by counting the number of secondary pulses of the reconstituted crankshaft signal, starting from the single main pulse.

BRIEF DESCRIPTION OF THE DRAWINGS

Further features and advantages of aspects of the invention will become apparent from the following non-limiting description, with reference to the appended drawings, in which.

DETAILED DESCRIPTION OF THE PREFERRED EMBODIMENTS

Figure 1:
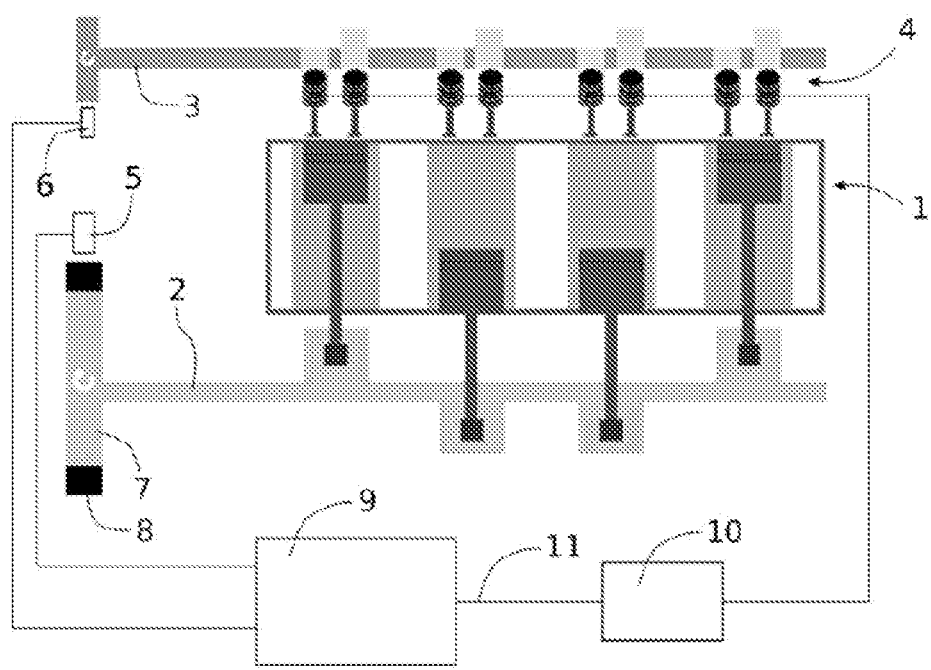
FIG. 1 is a schematic illustration of an internal combustion engine provided with a device according to an aspect of the invention.

FIG. 1 is a schematic illustration of the four-stroke internal combustion engine operating in a four-stroke engine cycle. Such a vehicle engine comprises a crankshaft 2 rotated by the pistons 1, together with a camshaft 3 actuating the valves 4 of the engine.

Precise knowledge of the instantaneous position of said engine is required in order to regulate the fuel injection means, the ignition means (for petrol engines), or any other additional function such as automatic engine stop and start. Said instantaneous position of the engine is determined on the basis of a crankshaft sensor 5 and a camshaft sensor 6. The sensors 5, 6 are known sensors and will not be described in further detail here. The sensors 5, 6, together with all of the other sensors and control members of the engine (not shown) are connected to the engine control unit 9.

In this example, the crankshaft 2 is connected to a flywheel 7 the circumference of which is associated with a toothed wheel 8. The toothed wheel 7 comprises one or more missing teeth in order to make the flywheel 7 rotationally asymmetrical and create an angular physical reference.

The camshaft sensor 6 makes it possible to determine the angular position of the camshaft 3. The crankshaft sensor 5 makes it possible to detect the passing of each of the teeth of the flywheel 7. The sensor 5 is also capable of detecting the gap corresponding to the missing teeth, and initializing a counter starting from this physical reference, so that after one complete crankshaft revolution, the crankshaft sensor 5 can determine the angular position of the crankshaft 2.

As is known, the engine control unit 9 is capable of carrying out a synchronization operation making it possible to map the information from the two sensors 5, 6 in order to determine the instantaneous position of the engine. Synchronization is carried out continuously, as the information is provided by the sensors 5, 6.

In this example, the engine is provided with an electric variable valve timing device comprising electric actuators, interposed between the camshaft 3 and the valves 4, making it possible to modulate the actuation of the valves 4. Said variable valve timing device comprises its own control electronics in a valve control unit 10 that is, in this example, physically separate from the engine control unit 9.

The valve control unit 10 also requires precise knowledge of the instantaneous position of the engine in order to operate.

The engine control unit 9 and the valve control unit 10 are connected by a communication bus 11 through which information about the synchronization operations that have taken place in the engine control unit 9 is transmitted, so that the valve control unit 10 can receive this information.

The engine control unit 9 transmits an electrical signal known as the "reconstituted crankshaft signal" to the valve control unit 10. Here, the reconstituted crankshaft signal corresponds to a signal that simulates the information that would be transmitted by a virtual signal capable of directly and unequivocally measuring the position of the engine in its cycle. Said reconstituted crankshaft signal comprises one electrical pulse for each tooth of the toothed wheel 8 passing in front of the sensor 5. Said pulses are all of the same predetermined duration, apart from one of said pulses, corresponding to a reference tooth, which is longer than the other pulses and only occurs when said reference tooth passes by during one of the two crankshaft revolutions over which the complete cycle of the four-stroke engine extends.

In other words, during the complete four-stroke cycle (which lasts for two crankshaft revolutions), a tooth selected as the reference tooth passes in front of the sensor 5 twice, and only one of these passes generates a long pulse.

Figure 2:
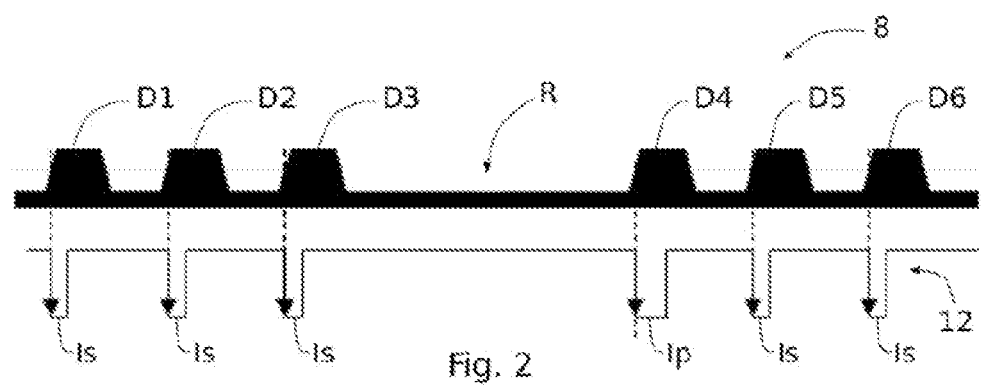
FIG. 2 is a first view illustrating the method according to a first embodiment of the invention.
Figure 3:
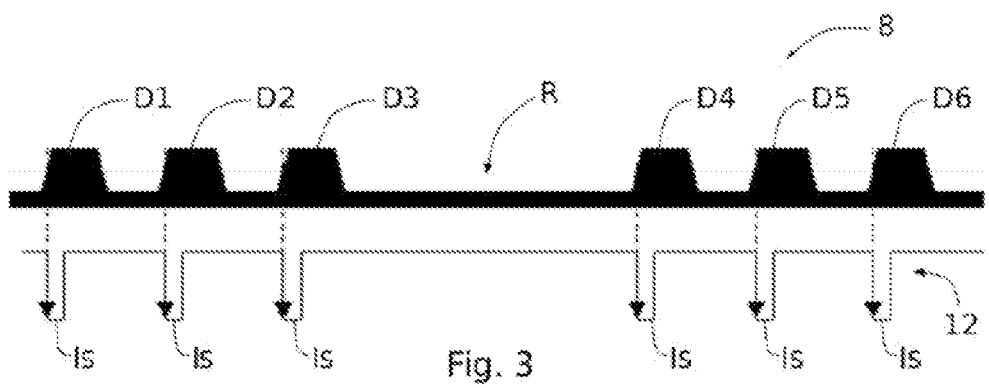
FIG. 3 is a second view illustrating the method according to a first embodiment of the invention.

FIGS. 2 and 3 schematically illustrate a portion of the toothed wheel 8, laid out flat. These figures both show the same six-tooth portion: FIG. 2 illustrates the passing of this portion in front of the sensor 5 during the first crankshaft revolution of a cycle; and FIG. 3 illustrates the passing of the same portion in front of the sensor 5 during the second crankshaft revolution of this cycle.

The portion of the toothed wheel 8 illustrated comprises six teeth D1 to D6, together with a gap R corresponding to two missing teeth, which constitutes a signature or physical marker on the toothed wheel 8.

Synchronization is carried out in real time by the engine control unit 9 and, at the moment when each of the teeth D1 to D6 passes in front of the sensor 5, the engine control unit 9 knows the position of the engine in its four-stroke cycle.

One tooth of the toothed wheel 8 is selected as the reference tooth for the implementation of the method. In the present illustrative example, tooth D4 is selected as the reference tooth. Said reference tooth is not involved in the synchronization operations that take place within the engine control unit 9, and is only involved in producing the reconstituted crankshaft signal, which is transmitted to the unit 10 as said synchronization operations are carried out.

FIGS. 2 and 3 illustrate the reconstituted crankshaft signal 12 mapped with the passing of the teeth of the toothed wheel 8, transmitted to the module 10. In this example, the reconstituted crankshaft signal 12 comprises a pulse triggered on each rising edge of a tooth of the toothed wheel 8, sensed by the sensor 5. In the engine control unit 9, each time the rising edge of a tooth is detected, the engine control unit 9 sends on the communication bus 11 a pulse the duration of which is selected from two predetermined durations: a first duration corresponding to a main pulse Ip, and a second duration corresponding to a secondary pulse Is.

The complete reconstituted crankshaft signal 12 extends over two crankshaft revolutions, in the nominal direction of rotation of the engine, and therefore comprises an electrical signal having:

a long single main pulse Ip, corresponding to the first pass of the reference tooth D4;

a short secondary pulse Is for each pass of the other teeth and for the second pass of the reference tooth.

In this example, the duration of the single main pulse is 60 µs and the duration of the secondary pulses is 45 µs.

In summary, the engine control unit 9 is programmed to generate on the bus 11, in the context of the construction of the reconstituted crankshaft signal 12, a 45 µs pulse (second predetermined duration) for all of the teeth of the toothed wheel 8 and for one of the passes of the reference tooth D4, and a 60 µs pulse (first predetermined duration) for the other pass of the reference tooth D4. This reconstituted crankshaft signal extends over two crankshaft revolutions corresponding to one four-stroke engine cycle, and is repeated on each cycle.

The valve control unit 10, receiving the reconstituted crankshaft signal 12, can determine the position of the engine in its four-stroke cycle without any external information other than said signal 12.

The single main pulse Ip makes it possible to establish an initialization reference that allows the valve control unit 10 to count the teeth starting from said initialization reference. As there is a single main pulse Ip for each cycle, that is, over two crankshaft revolutions, this initialization reference is valid for a complete cycle of the four-stroke engine.

Optionally, when the engine control unit 9 has not yet carried out the synchronization operation, or synchronization has been lost, the reconstituted crankshaft signal 12 consists of secondary pulses Is only. The lack of receipt of main pulses Ip makes it possible to indicate to the valve control unit 10 that synchronization is absent or has been lost.

According to a preferred embodiment, the reference tooth (D4 in the example) is selected as being adjacent to the toothless gap R. In this example, the reference tooth D4 immediately follows this gap R in the nominal direction of rotation of the engine. The reference point relating to the construction of the reconstituted crankshaft signal 12 thus occurs just after the reference point relating to the synchronization operation of the engine control unit 9, thus limiting errors.

The control unit 10 thus receives information from the engine control unit 9 allowing it to directly determine the instantaneous position of the engine in its four-stroke cycle, by counting the number of secondary pulses Is following the single main pulse Ip of each cycle. This information is received by the control unit 10 without it being connected to any sensors and without a synchronization operation being carried out. Only the reconstituted crankshaft signal 12, which is an electrical signal comprising a small quantity of data, passes through the communication bus 11, requiring negligible calculation and bandwidth resources.

In practice, the valve control unit 10 can comprise simple means for reading the reconstituted crankshaft signal 12 similar to those used to read the signal transmitted by a sensor. Each pulse of the signal 12 can be compared to a threshold such as, according to the example described above, 45 µs to 50 µs. All of the pulses received of a duration below this threshold are identified as secondary pulses Is that therefore correspond to the passing of a conventional tooth, and each pulse greater than this threshold will be identified as the single main pulse of a cycle, which corresponds to the passing of the predetermined reference tooth in one of the corresponding two crankshaft revolutions.

The valve control unit 10 simply requires an incremental counter that is reset on each single main pulse, for example. The counter is incremented each time a tooth passes by.

Figure 4:
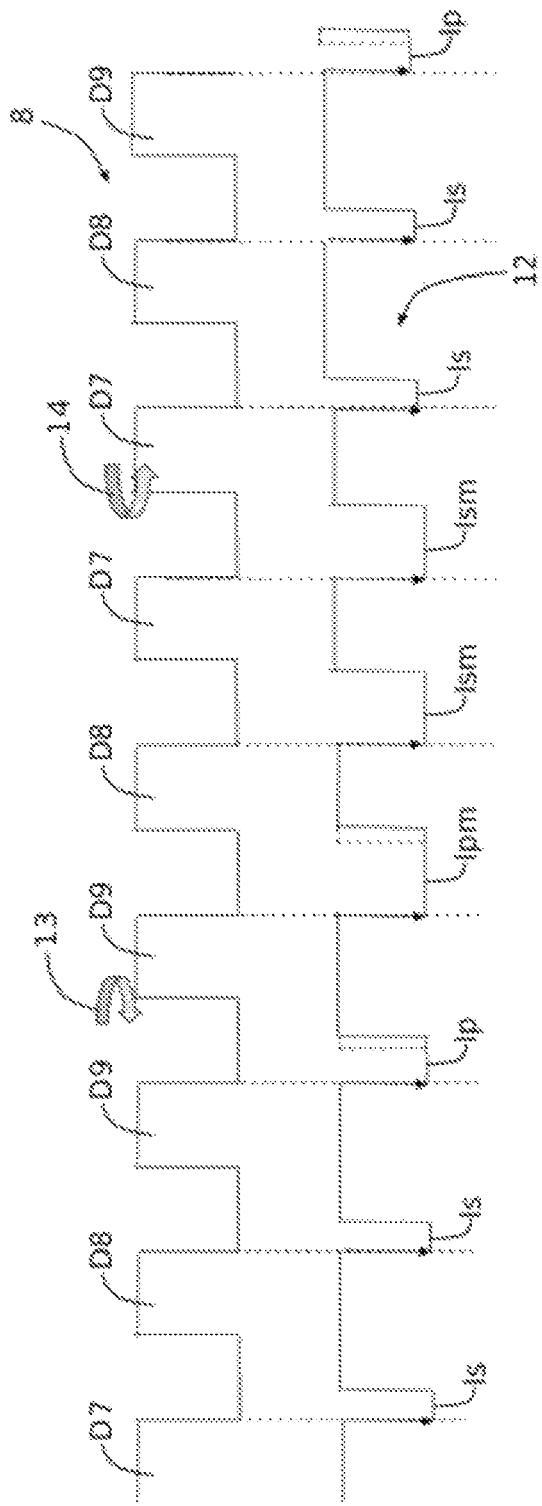
FIG. 4 illustrates the method according to a second embodiment of the invention.

FIG. 4 illustrates a second embodiment of the invention with the same reference signs. This figure is similar to FIGS. 2 and 3 and shows a portion of the toothed wheel 8 laid out flat. The reconstituted crankshaft signal 12 is also shown schematically mapped on the portion of the toothed wheel 8.

According to this second embodiment, the engine control unit 9 is capable of differentiating between situations in which the engine is running in its nominal direction of rotation and situations in which it is running in the opposite direction, which occurs sometimes for example when the engine is switched off.

In this configuration, the crankshaft and camshaft sensors 5, 6 and the synchronization means of the engine control unit 9 are able to determine together the direction of rotation of the engine. The sensors and the means for using them are known and will not be described in further detail here. It should simply be remembered that the engine control unit 9 thus has data available to it indicating the passing of each of the teeth of the toothed wheel 8 and the direction of rotation of the engine associated with this passing of teeth.

The portion of teeth D7 to D9 is shown in the illustrative example in FIG. 4. In this second embodiment, each pulse of the reconstituted crankshaft signal is generated on the falling edge of each tooth. This has the effect of allowing the engine control unit 9 to carry out the synchronization and determine the direction of rotation of the engine by comparing the rising edge and the falling edge of each tooth. The full information (passing of a tooth and direction of rotation) is therefore known on the falling edge of a tooth.

In the example in FIG. 4, a first portion of the figure shows three teeth D7 to D9 passing in front of the sensor 5 in the nominal direction of rotation of the engine, up to an event 13 during which the direction of rotation of the engine is reversed. A second portion of the figure shows the teeth D7 to D9 passing in the opposite direction, up to a second event 14 in which the direction of rotation of the engine is reversed, so that it returns to the nominal direction of rotation of the engine. A third portion of the figure shows the teeth D7 to D9 passing in front of the crankshaft sensor 5 in the nominal direction of rotation again.

In this schematic time configuration, which has been simplified for the purposes of this description, the reconstituted crankshaft signal 12 would have the profile illustrated in FIG. 4. In this example, the predetermined reference tooth is tooth D9. Here, the signal 12 chronologically comprises:

a secondary pulse Is having a predetermined second duration, here 45 µs, triggered when the falling edge of tooth D7 passes in front of the crankshaft sensor 5;

a 45 µs secondary pulse Is corresponding to tooth D8 passing in front of the sensor 5 in the nominal direction of rotation of the engine;

a 60 µs main pulse Ip corresponding to reference tooth D9 passing in front of the crankshaft sensor 5;

a modified main pulse Ipm corresponding to reference tooth D9 passing by in the opposite direction to the nominal direction of rotation of the engine. This modified main pulse Ipm has a predetermined third duration, 105 µs here;

a modified secondary pulse Ism corresponding to tooth D8 passing by in the opposite direction of rotation, said pulse Ism having a predetermined fourth duration, 90 µs here;

a 90 µs modified secondary pulse Ism corresponding to tooth D7 passing by in the opposite direction of rotation;

a 45 µs secondary pulse Is corresponding to tooth D7 passing by again in the nominal direction of rotation of the engine;

a 45 µs secondary pulse Is corresponding to tooth D8 passing in front of the sensor 5 in the nominal direction of rotation of the engine;

a 60 µs main pulse Ip corresponding to reference tooth D9 passing in front of the crankshaft sensor 5 in the nominal direction of rotation of the engine.

There is a single primary pulse for each cycle, that is, over two crankshaft revolutions in one direction of rotation.

In this second embodiment, the reconstituted crankshaft signal is constituted identically to the first embodiment when the engine is running in its nominal direction of rotation. However, this second embodiment adds information provided by the engine control unit 9 on the communication bus 11 when the engine is running in the opposite direction. When the engine is running in the opposite direction to its nominal direction of rotation, each pass of a tooth of the toothed wheel 8 generates, in the reconstituted crankshaft signal 12, a modified secondary pulse Ism for all of the teeth of the toothed wheel 8, apart from the reference tooth (here, D9), for which a single modified main pulse Ipm is generated for just one of the passes of the reference tooth during the two crankshaft revolutions of a four-stroke engine cycle in the opposite direction.

Of course, there is little chance that the engine will make two crankshaft revolutions in the opposite direction. This overview aims to describe the operation of the method when the engine is running in the opposite direction: the method results in a reconstituted crankshaft signal certain portions of which correspond to rotation in the opposite direction, and these portions comprise modified secondary pulses Ism, which are longer than the main and secondary pulses, as well as a single modified main pulse Ipm. Likewise, this modified main pulse is said to be a single pulse over two crankshaft revolutions. Although it is improbable that an engine will run continuously in the opposite direction, if it did occur (for example, with the gearbox in first gear and the vehicle reversing back down a slope), the method according to an aspect of the invention would still apply.

In other words, the electrical signal transmitted on the communication bus 11 can comprise:

portions corresponding to the engine running in its nominal direction of rotation, in which there is a single main pulse Ip and secondary pulses Is, as described for the first embodiment;

portions corresponding to the engine running in the opposite direction of rotation, also having a modified main pulse Ipm and modified secondary pulses Ism (over two crankshaft revolutions, even if they do not occur in practice).

According to this second embodiment, the valve control unit 10 receives not only the information about the instantaneous position of the engine when it is running in its nominal direction of rotation, but also has this information available to it when the engine is running in the opposite direction. Said information is transmitted with an electrical signal that has the same level of simplicity as in the first embodiment. The valve control unit 10 simply identifies four different pulse durations (optionally using thresholds), which thus allows it to identify the passing of the teeth in one direction and in the other, so that the number of teeth can be counted starting from the reference tooth.

Variant embodiments of the method can be implemented without departing from the scope of the invention. For example, the predetermined first, second, third and fourth durations can have different values from those given here as examples; what matters is that all of these pulse durations must be shorter than the period of time between the passing of one tooth and the passing of the next tooth, so that the durations of the pulses of the electrical signal are clearly distinguishable.

The reconstituted crankshaft signal can be transmitted to any type of engine device that comprises its own control electronics and needs to know the instantaneous position of the engine.

The invention claimed is:

1. A method for controlling a four-stroke internal combustion engine comprising a first sensor detecting an angular position of the camshaft and a second sensor detecting a passing of the teeth of a toothed wheel associated with the crankshaft, said method comprising:
    determining an instantaneous position of the engine in its four-stroke cycle on the basis of information provided by said sensors;
    producing a reconstituted crankshaft signal comprising an electrical signal extending over two crankshaft revolutions in a nominal direction of rotation of the engine, said electrical signal comprising:
    a single main pulse, having a predetermined first duration, corresponding to the passing of a predetermined reference tooth of the toothed wheel associated with the crankshaft;
    a plurality of secondary pulses, each having a predetermined second duration, each corresponding to the passing of a tooth of the toothed wheel associated with the crankshaft;
    the predetermined first duration being greater than the predetermined second duration.

2. The method as claimed in claim 1, wherein, during the two crankshaft revolutions in the nominal direction of rotation of the engine, over which the reconstituted crankshaft signal extends, the reference tooth passes in front of the second sensor twice, the single main pulse being generated for one of said passes, and a secondary pulse being generated for the other of said passes.

3. The method as claimed in claim 2, wherein the toothed wheel associated with the crankshaft comprises a toothless gap; and the predetermined reference tooth is adjacent to this toothless gap.

4. The method as claimed in claim 1, wherein the toothed wheel associated with the crankshaft comprises a toothless gap; and the predetermined reference tooth is adjacent to this toothless gap.

5. The method as claimed in claim 1, wherein, if the engine is running in its opposite direction of rotation, the electrical signal of the reconstituted crankshaft signal comprises, over two crankshaft revolutions in the opposite direction:
    a single modified main pulse, having a predetermined third duration, corresponding to the passing of the predetermined reference tooth in the opposite direction of rotation of the engine;
    a plurality of modified secondary pulses, each having a predetermined fourth duration, each corresponding to the passing of a tooth of the crankshaft in the opposite direction of rotation of the engine;
    the predetermined third duration being greater than the predetermined fourth duration.

6. The method as claimed in claim 5, wherein the predetermined fourth duration is greater than the predetermined second duration.

7. The method as claimed in claim 6, wherein the electrical signal of the reconstituted crankshaft signal combines signal segments comprising secondary pulses corresponding to the engine running in the nominal direction of rotation, and signal segments comprising modified secondary pulses corresponding to the engine running in the opposite direction of rotation.

8. The method as claimed in claim 5, wherein the electrical signal of the reconstituted crankshaft signal combines signal segments comprising secondary pulses corresponding to the engine running in the nominal direction of rotation, and signal segments comprising modified secondary pulses corresponding to the engine running in the opposite direction of rotation.

9. The method as claimed in claim 1, wherein the step of determining the instantaneous position of the engine in its four-stroke cycle on the basis of the information provided by said sensors is carried out by an engine control unit to which said sensors are connected; and the reconstituted crankshaft signal is transmitted by a communication bus to a control unit specific to one member of the engine.

10. The method as claimed in claim 9, wherein the specific control unit determines the position of the engine in its four-stroke cycle by counting the number of secondary pulses of the reconstituted crankshaft signal, starting from the single main pulse.

11. An engine control device capable of implementing the method as claimed in claim 1, the device comprising:
    an engine control unit to which said sensors are connected;
    a control unit specific to one member of the engine;
    a communication bus connecting the engine control unit to the specific control unit, and capable of transmitting the reconstituted crankshaft signal.

12. The device as claimed in claim 11, wherein the specific control unit is an electric variable valve timing control unit.

* * * * *